United States Patent [19]
McPherson

[11] 3,722,272
[45] Mar. 27, 1973

[54] CLEAR AIR TURBULENCE DETECTORS

[75] Inventor: Alasdair McPherson, Keysoe, England

[73] Assignee: The Secretary of State for Defence in Her Britannic Majesty's Government of the United Kingdom of Great Britain and Northern Ireland, London, England

[22] Filed: July 9, 1971

[21] Appl. No.: 161,177

[30] Foreign Application Priority Data

July 10, 1970 Great Britain.....................33,541/70

[52] U.S. Cl. ...............................................73/178 R
[51] Int. Cl. ................................................G01c 21/00
[58] Field of Search.............73/178 R, 178 T, 178 H; 250/83.3 H

[56] References Cited

UNITED STATES PATENTS 3,402,295    9/1968    Astheimer.......................250/83.3 H
3,427,581    2/1969    Hartman............................73/178 R Primary Examiner—Donald O. Woodiel
Attorney—Hall, Pollock & Vande Sande

[57] ABSTRACT

A radiometer for use in aircraft as part of a clear air turbulence detector apparatus, constructed to provide signals representing the atmospheric temperatures of at least three regions ahead of the aircraft and centered about sight-lines having different angles of elevation or declination with respect to the aircraft, is connected to means for deriving a temperature-difference signal indicating the difference between the measured temperature of a central one of the regions and an average of the measured temperatures of two regions on opposite sides of the central region. The apparatus preferably includes a correction-signal deriving circuit for deriving a correction-signal dependent upon the local tropopause height at the time of flight and the altitude of the regions subject to temperature measurement and a display for indicating when the temperature-difference signal differs significantly from the correction signal.

6 Claims, 5 Drawing Figures

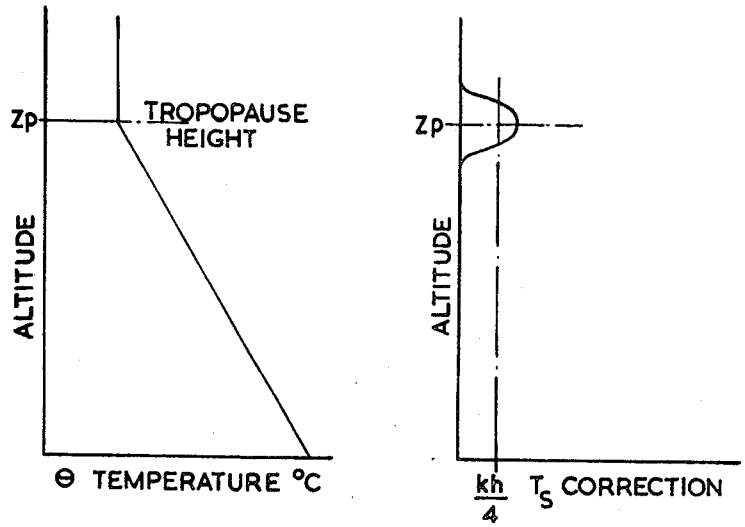
FIG. 3.
FIG. 4.
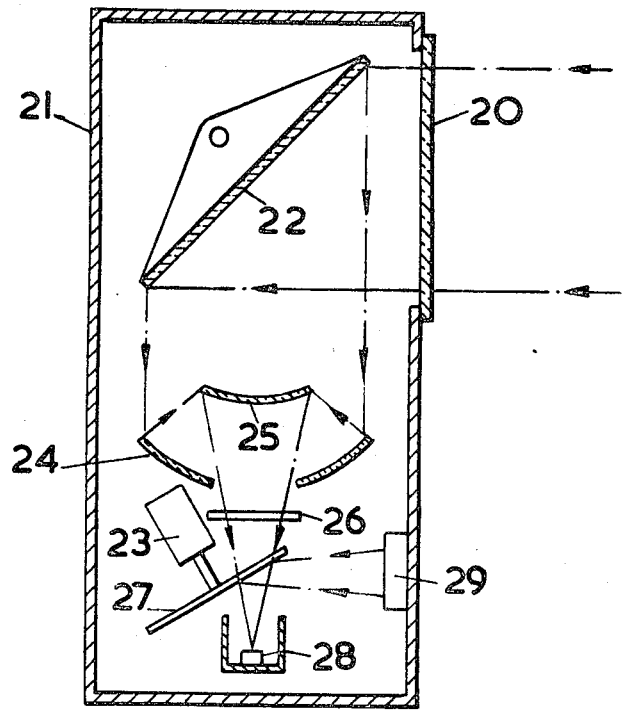
FIG. 5.

CLEAR AIR TURBULENCE DETECTORS

BACKGROUND OF THE INVENTION

In aircraft operations, in which the safety and comfort of the occupants of an aircraft are important, it is desirable that the aircraft's flight path is chosen such that it avoids regions of turbulent air. In cloudy conditions the pilot may have a visual indication of areas of air turbulence in the disposition, shape and movement of the clouds. However air turbulence, often severe, is sometimes encountered in clear air and in these cases the pilot has no visual warning of its presence and is therefore unable to take avoiding action.

There is evidence that clear air turbulence (CAT) sometimes exists in the atmosphere where there is a change of air temperature along a horizontal path at a given height above the surface of the earth. It has therefore been proposed that a passive infra-red radiometer capable of measuring the air temperature some tens of miles ahead of an aircraft might form the basis of a CAT detector. However, the correlation between temperature changes along a horizontal path and the presence and intensity of turbulence is not sufficiently established to make this a reliable form of CAT detector.

It has also been suggested that a good way to avoid CAT is to fly above or below it, and therefore a detector with a vertical scanning facility has been constructed and used, and more recently it has been suggested that the patterns formed by traces of the radiometer output plotted versus the vertical scan should be examined as a possible means of detecting layers of air subject to CAT. However, the reported experiments with this equipment indicate that a skilled and careful study of the radiometer trace would be required to identify any CAT layer, and an intolerably large proportion of false alarms is highly probable. The known reports do not appear to distinguish clearly the form, or forms of pattern which should be associated with dangerous CAT, and it is clear that the known apparatus does not provide a convenient or practically satisfactory CAT detector.

It is an object of the present invention to provide an improved CAT detector with a comparatively simple output which can be assessed more readily and conveniently and can be satisfactorily correlated with dangerous CAT.

It is a further object of the invention to provide CAT detector apparatus and methods for using it so as to achieve reliable CAT detection with a tolerably low probability of false alarm indications.

SUMMARY OF THE INVENTION

According to the present invention there is provided a clear air turbulence detector apparatus for use in an aircraft including a radiometer constructed to provide signals respectively representing the mean temperatures of at least three regions in the atmosphere ahead of the aircraft and centered about sight-lines having different angles of elevation or depression with respect to the aircraft, and means connected thereto for deriving a temperature-difference signal dependent on the difference between the measured mean temperature of a central one of the regions and an average of the measured mean temperatures of two regions on opposite sides of the central region.

The apparatus preferably also includes a correction-signal deriving circuit for deriving a correction-signal dependent on the altitude of the flight path or of the said central region and a prediction of the vertical atmospheric temperature profile existing in the vicinity of the central region at the time of the measurement of the temperatures and display means responsive to a difference between said temperature-difference signal and said correction signal.

The radiometer may be constructed to make the required temperature measurements either simultaneously, producing three signals from separate detectors with different fields of view, or sequentially by means of an arrangement for cyclically changing the radiometer's effective field of view. The latter arrangement is preferred on account of the difficulty of getting matched responses from three separate detectors.

It has been found that clear air turbulence is frequently associated with an abnormal (though comparatively stable) type of vertical temperature distribution wherein an atmospheric layer from 0.5 to 1.5 km deep has an abnormally low temperature, with warmer air above and below the cool layer. The apparatus herein described provides a convenient means of quantitatively identifying such a turbulence prone layer by calculating and indicating a temperature difference signal T for the measured regions, determined by the equation $$T = \theta_b - \tfrac{1}{2}(\theta_c + \theta_a) \qquad (1)$$

where $\theta_b$ is the mean temperature of the central region and $\theta_a$ and $\theta_c$ are the mean temperatures of two regions respectively above and below the central region.

It is known that in the absence of local weather conditions, the temperature in the atmosphere normally decreases with altitude in an approximately linear manner, at a rate of typically 2° C. per 1,000 feet, substantially up to a height known as the tropopause height, and thereafter normally remains constant with further increases in altitude, at least up to the highest altitude at which serious clear air turbulence has been known to occur. A normal tropopause of this kind is usually only associated with a slight degree of clear air turbulence. However, when a radiometer of the kind hereinbefore described is used so that the tropopause height lies within one of its fields of view, the normal atmospheric temperature distribution will cause it to produce a negative temperature-difference signal. This temperature-difference signal arising from the sampling of a normal atmospheric temperature distribution will have a maximum value when the central region is centered on the tropopause height, and will be reduced at other heights in a predictable manner dependent on the depths of the three atmospheric regions measured and the relative altitudes of the flight path and the tropopause. The tropopause height varies with the time of day, season of the year, geographical location, and possibly other meteorological factors. Data signals from radiosonde balloons which are regularly sent up from meteorological observation stations will enable the height of the tropopause to be estimated at any given time and place. Hence the temperature-difference signal to be expected in a normal atmospheric temperature distribution may be calculated for the actual altitude, time and place of a given flight.

Regions of clear air turbulence may be associated with an abnormal atmospheric temperature distribution above or below the tropopause, or with abnormal forms of tropopause having an abnormally high rate of decrease in temperature just below the tropopause, or with a temperature increase at heights just above the tropopause. These regions of clear air turbulence will be associated with negative temperature-difference signals of greater magnitude than the signals to be expected from comparable observations at the same height relative to the tropopause in a normal atmospheric temperature distribution.

The preferred form of CAT detector apparatus is made capable of indicating the value of a discrepancy function $T^*$ which is defined by the equation $$T^* = T - T_S \qquad (2)$$

where $T$ is the temperature-difference signal derived from the actual radiometer measurements as hereinbefore described, and $T_S$ is the calculated temperature-difference signal which one would expect to obtain from the same fields of view if the surrounding atmosphere had a normal temperature distribution. Comparatively large negative values of the function $T^*$ (of the order of $-2°C$) will indicate a high probability of serious clear air turbulence ahead.

In order to apply the $T_S$ correction accurately (and thereby obtain more reliable indications with fewer false alarms) the radiometer itself may be used to find the actual height of the tropopause in the atmosphere ahead of the aircraft, since this will give a more accurate indication than an interpolation based on the nearest available radiosonde data and other predictions. For this purpose the radiometer may be made to sweep over a vertical scan including the estimated tropopause height; this may be achieved by tilting the whole, or part, of the radiometer with respect to the aircraft, by flying the aircraft on an ascending or descending path or by changing its attitude Conveniently, this scan may be made to sweep downwards through a range which is expected to include the tropopause. A maximum in the $T$ signal output (with no $T_S$ correction applied) will then occur when the center of the radiometer fields of view scans past the actual tropopause height; this height can be noted by observation, or automatically detected, and should then be applied to set and control the $T_S$ correction which can then be applied with greater confidence.

Spurious signals can be generated if clouds, or the surface of the earth, are included in the radiometer's fields of view. In such conditions, at least one of the radiometer output signals is likely to be unusually large. Hence it may be desirable to provide means for inhibiting or covering the display of the radiometer output when any unusually large signals occur, in order to reduce the possibility of false alarms or unreliable indications.

BRIEF DESCRIPTION OF THE DRAWINGS

Typical embodiments of the invention and methods for using them will now be described, by way of example only, with reference to the accompanying drawings, of which

DESCRIPTION OF THE PREFERRED EMBODIMENTS

Figure 1:
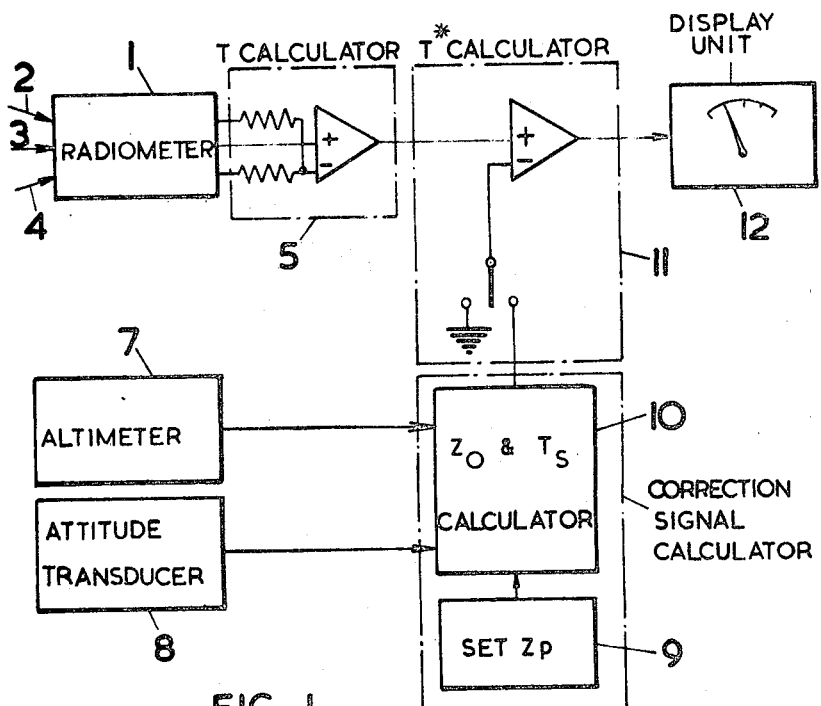
FIG. 1 is a schematic circuit diagram of a clear air turbulence detector.

FIG. 1 shows schematically a passive infra-red radiometer 1, incorporating means (a movable shutter or mirror, for instance) for receiving radiation sequentially from three different fields of view disposed about the sight-lines 2, 3 and 4 respectively. The sight-lines 2 and 4 are inclined to the direction of the central sight-line 3 by equal angles which are actually about 1°; for the sake of clarity these angles have been greatly exaggerated in FIG. 1 and FIG. 2.

The radiometer may be constructed according to established techniques in the art, for instance as described in U.S. Pat. No. 3,402,295 or copending UK Pat. applications Nos. 11,868/69 and 9,790/67, or as hereinafter described with reference to FIG. 5.

Outputs of the radiometer 1, which will carry signals representing the amounts of energy received along different sight-lines, are connected to a temperature difference ($T$) signal calculator unit 5. Outputs from an altimeter 7 and an attitude transducer 8 are connected to a correction signal calculator unit, which comprises a tropopause height input (set $Z_p$) control 9 and a $Z_o$ and $T_S$ calculator unit 10. Outputs from the calculator units 5 and 10 are connected to a $T^*$ calculator unit 11; a switch is provided to allow one input of the $T^*$ calculator 11 to be held at a constant, zero-indicating potential instead of receiving the $T_S$ correction signal from the unit 10, thereby cutting out the $T_S$ correction if desired. The output of the $T^*$ calculator unit 11 is applied to a display unit 12.

The calculator units 5, 10 and 11 can be digital or analogue computing circuits designed by techniques conventional in the computer art. The $T$ calculator 5 derives a signal indicating the temperature-difference T from the radiometer output signals, according to the equation (1). The $T^*$ calculator 11 derives a signal representing $T^*$ according to the equation (2). The calculator 10 is constructed to calculate the height ($Z_o$) of the center of the regions whose mean temperatures are measured by the radiometer, and then to derive a signal representing the correction $T_S$ as will now be described with reference to FIGS. 2, 3 and 4.

Figure 2:
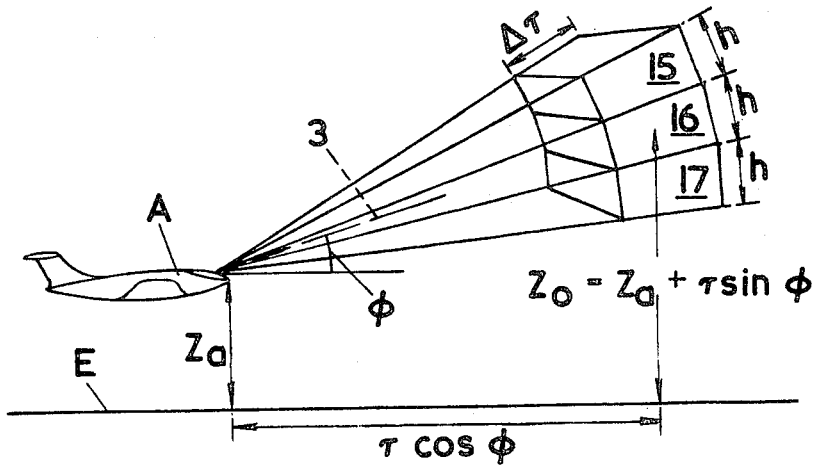
FIG. 2 is a diagram indicating the fields of view and measurements made by a radiometer in the detector of FIG. 1, FIGS. 3 and 4 are graphical diagrams illustrating a normal atmospheric temperature distribution and the corresponding $T_S$ correction respectively, and, FIG. 5 is a schematic sectioned drawing of a suitable form of radiometer for use in the detector of FIG. 1.

The apparatus of FIG. 1 is all mounted in an aircraft, and FIG. 2 illustrates its use. The aircraft A is indicated flying at an altitude $Z_a$ above a line E which represents the surface of the earth. It is known that passive radiometer measurements effectively indicate the mean temperatures of regions of the atmosphere in the radiometer's field of view at a range $r$ which is mainly determined by the spectrum band to which the radiometer is sensitive. In the present apparatus, the radiometer is constructed to measure the mean temperatures of three regions 15, 16 and 17 sequentially. These regions are adjacent and preferably of equal size, each having a height or thickness $h$, which is preferably in the range from 0.5 to 1.5 km. The region 16 is centered on the line of sight 3 which is shown inclined at an angle $\phi$ to the horizontal; the angle $\phi$ will clearly depend on the attitude of the aircraft A and the orientation of the radiometer relative to the aircraft. It follows that the altitude $Z_o$ of the center of the region 16 will be $$Z_o = Z_a + r \sin \phi \qquad (3)$$

if no correction is made for the curvature of the earth. The radiometer's spectrum band is chosen to make the range $r$ about 30 km, and the earth's curvature may reasonably be neglected. (In other embodiments of the invention using a longer range the earth's curvature may become more significant and can readily be allowed for).

Since the altimeter 7 and attitude transducer 8 will provide indications of $Z_a$ and $\phi$ respectively, the unit 10 can easily be constructed to calculate $Z_o$ from equation (3). Since the regions 15–17 have an appreciable length $\Delta r$, $\phi$ must be kept small so that $\Delta r \sin \phi$ is much smaller than $h$.

FIG. 3 is a graph showing an idealized normal atmospheric temperature distribution. The broken line indicates the tropopause height, at an altitude $Z_p$. By considering the effect of averaging the temperatures over adjacent layers of height h centered on various heights relative to the tropopause in a normal atmospheric temperature distribution of this kind, it can be shown that the corresponding correction signal is given by the set of equations $$-T_S = k(3h/8 - Z^2/2h) \text{ for } |Z| \leq h/2 \qquad (4a)$$

$$-T_S = k[1.5h - Z^2/4h] \text{ for } |Z| \geq h/2 \text{ but} \leq 3h/2 \qquad (4b)$$

$$-T_S = 0 \text{ for } |Z| \geq 3h/2 \qquad (4c)$$

where $k$ is proportional to the mean rate of decrease of temperature with increasing altitude below the tropopause, and $Z = Z_o - Z_p =$ the difference in altitude between the actual position of the tropopause and the center of the central field of view of the radiometer. FIG. 4 shows the correction signal $T_S$ plotted against $Z$ according to these equations 4a–4c.

The radiometer 1 in the CAT detector herein described may have the form shown diagrammatically in FIG. 5. This comprises an infra-red window 20 in an otherwise radiation tight box 21. A mirror 22, mounted within the box 21, can be rocked about a pivot by an incremental nodding mechanism (not shown) which is driven by an electric motor 23. The mirror 22 directs radiation received through the aperture 20 onto a Cassegrainian optical system, comprising a concave mirror 24 and a convex mirror 25, which focusses the radiation through a spectral filter 26 and through apertures in a chopper disc 27 on to the surface of an infra-red detector 28.

The chopper disc 27 is arranged to be rotated by the motor 23, and is inclined at such an angle that when one of its vanes intercepts the radiation from the aperture 20, radiation from a reference surface 29 is reflected from the underside of the vane on to the infrared detector 28. The reference surface 29 is maintained at a constant temperature (approximately in the middle of the range of atmospheric temperatures likely to be encountered) by a temperature stabilizing system (not shown). The chopper disc 27 and the mechanism for nodding the mirror 20, being driven from the same motor 23, are synchronized so that atmospheric radiation measurements made through consecutive apertures of the disc 27 refer to different regions such as the regions 15, 16 and 17 respectively of FIG. 2, and the radiation from the reference surface 29 is measured between each atmospheric measurement and the next, to allow any drift in the response of the detector 28 to be compensated.

Because the density of the atmosphere decreases with increasing height above the earth's surface, the effective range of the radiometer measurements ($r$ in FIG. 2) may increase appreciably with altitude $Z_o$. The movement of an aircraft carrying the detector may be used to compensate in part for this effect by arranging the nodding mechanism to be driven so that the atmospheric regions are scanned in decreasing height order. The apertures in the disc 27 can also be provided with filters of different attenuating powers to further compensate for the range discrepancies between successive measurements due to density variations and aircraft movement.

As hereinbefore suggested, the radiometer itself can be used to find the tropopause height more accurately, or follow its variations if it varies along the flight path. For this purpose, signals representing one or two or more of the quantities $\theta a$, $\theta b$, $\theta c$, and $T$ (e.g., the output signals of the radiometer 1 and/or the $T$ calculation unit 5) may be applied to a store or shift register, and a comparator and logic circuits provided to correct the tropopause height Zp set in the unit 9 of FIG. 1. These parts may be arranged to operate in various ways in various circumstances. For instance, when the aircraft is climbing towards the tropopause, the comparator and store may be connected to compare a current measurement of $\theta a$ with the preceding measurement of $\theta a$; as the aircraft is ascending, the current measurement will refer to a region at higher altitude. When two consecutive measurements of $\theta a$ are substantially equal, this may be taken as an indication that the regions measured were above the tropopause; the comparator can be arranged to provide an output when this first occurs which acts through the logic circuits to cause the height Zo corresponding to the earlier measurement to be entered as the exact tropopause height in the unit 9. This action should be inhibited when the height Zo is more than a predetermined amount (e.g., a few thousand feet) less than an estimate of the tropopause height based on meterological data and previously entered in the set Zp unit 9.

Conversely, when the aircraft is descending towards a tropopause and is known to be within a few thousand feet above it, when $\theta c$ has become greater than $\theta b$ and $\theta b$ begins to increase to become greater than $\theta a$, this can be taken as an indication that the boundary between the central region (16) and the lowest region (17) has reached the tropopause, and an appropriate signal derived for resetting the set Zp unit accordingly.

Clearly, many variations of the system are possible. The attitude transducer 8 and its input to the calculator 10 may be omitted; a fixed value of $\phi$ (probably zero) will then be used in all calculations. Setting $\phi = 0$ in effect makes the approximation Zo = Za, which means that the Ts correction can only be applied accurately in level flight, a disadvantage which might be accepted for the sake of simplicity. Instead of a mechanical nodding system driven by the motor 23, solenoids may be provided to set the mirror 22 in each of the required positions sequentially. These solenoids may be controlled by contacts or proximity detector devices operated by the motor 23 to ensure that the mirror 22 is rocked in synchronism with the rotation of the chopper disc 27 as hereinbefore described.

The attitude transducer 8 may be a conventional pendulum type pitch transducer.

I claim:

1. A clear air turbulence detector apparatus for use in an aircraft comprising a radiometer constructed to provide signals respectively representing the mean temperatures of at least three regions in the atmosphere ahead of the aircraft and centered about sight-lines having different angles of elevation with respect to the aircraft, and calculation means connected to the radiometer for subtracting the measured mean temperature of a central one of the regions from an average of the measured mean temperatures of two regions on opposite sides of the central region thereby to produce a temperature difference signal indicating the probability of encountering clear air turbulence in the neighborhood of said regions.

2. A clear air turbulence detector apparatus as claimed in claim 1 and also comprising:
adjustable tropopause height input setting means, for providing a tropopause height signal representing the altitude of the tropopause in the atmosphere ahead of the aircraft,
altimeter signal input means, for receiving an altimeter signal representing the altitude of the aircraft,
correction-signal deriving means, connected to the said tropopause height input setting means and to the said altimeter signal input means, for deriving a correction-signal dependent on the said tropopause height signal and the said altimeter signal and substantially equal to a value of the temperature-difference signal expected to be found in comparable measurements in clear, non-turbulent normal atmospheric conditions,
and display means, connected to the said calculation means and to the said correction-signal deriving means, for indicating the occurrence of a significant difference between the said temperature-difference signal and the said correction-signal.

3. A clear air turbulence detector apparatus as claimed in claim 2, also comprising pitch angle input means for receiving a signal indicating any inclination of the central sight-line of the radiometer's field of view, and wherein the said correction-signal deriving means is constructed and connected to derive a signal representing $Z_o$, the altitude of the center of the said central region and then derive the said correction-signal as a function of the difference between the said signal representing $Z_o$ and the said tropopause height signal.

4. A clear air turbulence detector apparatus as claimed in claim 2 wherein the correction-signal deriving means comprises an electronic circuit for deriving a correction-signal $T_s$ according to the set of equations:

$$-T_S = k(3h/8 - Z^2/2h) \text{ for } |Z| \leq h/2$$

$$-T_S = k[(1.5h - Z)^2/4h] \text{ for } |Z| \geq h/2 \text{ but } \leq 3h/2$$

$$-T_S = 0 \text{ for } |Z| \geq 3h/2$$

where $h$ is the height of each of the said at least three regions, $k$ is a constant proportional to the mean rate of decrease of temperature with increasing height below the tropopause, and $Z$ is the difference in altitude between the actual position of the tropopause and the center of the central field of view of the radiometer, and means for subtracting the correction-signal from the said temperature-difference signal to form a discrepancy function signal $T^*$ which can indicate conditions associated with clear air turbulence but is comparatively insensitive to the normal temperature distribution in the vicinity of the tropopause.

5. A clear air turbulence detector apparatus as claimed in claim 1 and wherein the said radiometer comprises means for cyclically changing the radiometer's effective field of view and thereby causing temperature measurements of the said three regions to be made sequentially.

6. A clear air turbulence detector apparatus as claimed in claim 5 and wherein the said radiometer comprises a reference surface and is constructed to make measurements of the said three regions sequentially in a cyclic sequence which also comprises at least one measurement of the reference surface in each cycle.

* * * * *